United States Patent
Hanson et al.

(10) Patent No.: US 9,361,922 B1
(45) Date of Patent: Jun. 7, 2016

(54) SPACING MEASUREMENT IMPROVEMENT IN THE PRESENCE OF TRACK MIS-REGISTRATION

(71) Applicant: HGST Netherlands B.V., Amsterdam (NL)

(72) Inventors: Weldon M. Hanson, Rochester, MN (US); Kazuhiro Saito, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/832,415

(22) Filed: Aug. 21, 2015

(51) Int. Cl.
*G11B 21/02* (2006.01)
*G11B 5/60* (2006.01)
*G11B 5/56* (2006.01)

(52) U.S. Cl.
CPC ... *G11B 5/60* (2013.01); *G11B 5/56* (2013.01)

(58) Field of Classification Search
CPC .... G11B 5/6005; G11B 5/59633; G11B 5/54; G11B 5/02; G11B 5/488; G11B 2220/90; G11B 15/087; G11B 5/09; G11B 20/10009; G11B 5/012
USPC .................................... 360/75, 21, 27, 39, 55
See application file for complete search history.

(56) References Cited

U.S. PATENT DOCUMENTS

| | | | |
|---|---|---|---|
| 4,777,544 A | 10/1988 | Brown et al. | |
| 5,168,413 A | 12/1992 | Coker et al. | |
| 7,016,131 B2 | 3/2006 | Liu et al. | |
| 7,079,340 B2 | 7/2006 | Igaki et al. | |
| 7,369,341 B2 | 5/2008 | Yokohata et al. | |
| 7,715,017 B2 | 5/2010 | Lacey | |
| 7,852,581 B2 | 12/2010 | Saito | |
| 7,889,448 B2 | 2/2011 | Lu | |
| 7,933,085 B2 | 4/2011 | Baumgart et al. | |
| 8,315,007 B1 * | 11/2012 | Sutardja | G11B 5/6005 360/75 |
| 8,934,192 B1 | 1/2015 | Kermiche et al. | |

OTHER PUBLICATIONS

Eaton et al., "In Situ Track Misregistration Measurement in Disk Drives," ip.com, IBM Technical disclosure Bulletin, vol. 34(3), Aug. 1991, 7 pp.
Shimizu et al., "Two-Dimensional Flying-Height Modulation Mapping at HDD Drive Level," IEEE Transactions on Magnetics, vol. 42(10), Oct. 2006, 3 pp.

* cited by examiner

*Primary Examiner* — Nabil Hindi
(74) *Attorney, Agent, or Firm* — Shumaker & Sieffert, P.A.

(57) ABSTRACT

Techniques for determining a relative spacing between a read head and a surface of a magnetic data storage device may use at least two magnetic spacing measurement patterns. A first magnetic spacing measurement pattern may be offset from a center of a data track by a first offset value and a second magnetic spacing measurement pattern may be offset by a second, different, offset value. A processor may determine a first harmonic tone and a second harmonic tone from each of the first and second magnetic spacing measurement patterns. The processor also may determine respective ratios between amplitudes of the first and second harmonic tones for each of the first and second magnetic spacing measurement patterns. The processor may determine which ratio is greater, and may utilize the greater ratio when determining relative spacing between the read head and the surface of the magnetic data storage device.

20 Claims, 7 Drawing Sheets

SPACING MEASUREMENT IMPROVEMENT IN THE PRESENCE OF TRACK MIS-REGISTRATION

TECHNICAL FIELD

This disclosure relates to storage devices, such as magnetic data storage devices.

BACKGROUND

In the operation of a hard disk drive or a tape drive, the read head transducer flies over the magnetic data storage device. When increasing data density on the magnetic data storage device, transducer fly-height may be reduced as measured from the disk surface to the transducer tip. Reduction of the transducer fly-height may result greater effective sensitivity of the read head to the magnetic fields of magnetic domains on the magnetic data storage device. As fly-height is reduced and data density increases, the read head can experience read errors from unwanted, substantially random positioning error relative to a data track due to vibration, electrical noise, or the like. These types of position errors are referred to herein as track mis-registration (TMR) effects. Therefore, magnetic spacing measurement improvements may be used to reduce the mean fly-height and variation in fly-height of the read head over the magnetic data storage device. The variance in measurements due to TMR become more problematic as track pitch is reduced and TMR targets become more difficult to achieve. Such fly-height considerations also are important for write head spacing.

SUMMARY

In some examples, the disclosure is directed to a storage device comprising a magnetic data storage device that includes a data track including a magnetic spacing measurement pattern grouping that includes a first magnetic spacing measurement pattern and a second magnetic spacing measurement pattern, a read head, and at least one processor. The first magnetic spacing measurement pattern may be offset from a center of the data track by a first offset value, and the second magnetic spacing measurement pattern may be offset from the center of the data track by a second, different offset value. The at least one processor may be configured to control the read head to pass over the data track including the first magnetic spacing measurement pattern and the second magnetic spacing measurement pattern, receive a signal indicative of magnetic transitions sensed by the read head during the pass, and determine, for each of the first magnetic spacing measurement pattern and the second magnetic spacing measurement pattern, a respective first harmonic tone based on the signal. The at least one processor also may be configured to determine, for each of the first magnetic spacing measurement pattern and the second magnetic spacing measurement pattern, a respective second harmonic tone based on the signal. The at least one processor further may be configured to determine, for each of the first magnetic spacing measurement pattern and the second magnetic spacing measurement pattern, a ratio of the respective first harmonic tone and the respective second harmonic tone, and may determine a maximum ratio. The at least one processor also may be configured to utilize the maximum ratio to determine a relative spacing between the read head and a surface of the magnetic data storage device.

In some examples, the disclosure is directed to a method including controlling, by at least one processor of a storage device, a read head to pass over a data track including a magnetic spacing measurement pattern grouping that includes a first magnetic spacing measurement pattern and a second magnetic spacing measurement pattern. The first magnetic spacing measurement pattern may be offset from a center of the data track by a first offset value, and the second magnetic spacing measurement pattern is offset from the center of the data track by a second, different offset value. A magnetic data storage device may include the data track. The at least one processor also may receive a signal indicative of magnetic transitions sensed by the read head during the pass. The at least one processor further may determine, for each of the first magnetic spacing measurement pattern and the second magnetic spacing measurement pattern, a respective first harmonic tone based on the signal. The at least one processor also may determine, for each of the first magnetic spacing measurement pattern and the second magnetic spacing measurement pattern, a respective second harmonic tone based on the signal. The at least one processor further may determine, for each of the first magnetic spacing measurement pattern and the second magnetic spacing measurement pattern, a ratio of the respective first harmonic tone and the respective second harmonic tone, and may determine a maximum ratio. The at least one processor also may utilize the maximum ratio in determining a relative spacing between the read head and a surface of the magnetic data storage device.

In some examples, the disclosure is directed to a system including means for controlling a read head to pass over a data track including a magnetic spacing measurement pattern grouping that includes a first magnetic spacing measurement pattern and a second magnetic spacing measurement pattern. The first magnetic spacing measurement pattern may be offset from a center of the data track by a first offset value, and the second magnetic spacing measurement pattern is offset from the center of the data track by a second, different offset value. A magnetic data storage device may include the data track. The system also may include means for receiving a signal indicative of magnetic transitions sensed by the read head during the pass. The system further may include means for determining, for each of the first magnetic spacing measurement pattern and the second magnetic spacing measurement pattern, a respective first harmonic tone based on the signal. The system also may include means for determining, for each of the first magnetic spacing measurement pattern and the second magnetic spacing measurement pattern, a respective second harmonic tone based on the signal. The system further may include means for determining, for each of the first magnetic spacing measurement pattern and the second magnetic spacing measurement pattern, a ratio of the respective first harmonic tone and the respective second harmonic tone. The system also may include means for determining a maximum ratio, and means for utilizing the maximum ratio in determining a relative spacing between the read head and a surface of the magnetic data storage device.

In some examples, the disclosure is directed to a computer-readable storage medium including instructions that, when executed, cause one or more processors of a storage device to control a read head to pass over a data track including a magnetic spacing measurement pattern that includes first magnetic spacing measurement pattern and the second magnetic spacing measurement pattern, and receive a signal indicative of magnetic transitions sensed by the read head during the pass. The first magnetic spacing measurement pattern may be offset from a center of the data track by a first offset value, and the second magnetic spacing measurement pattern is offset from the center of the data track by a second, different offset value. A magnetic data storage device may include the data track. The computer-readable storage medium may further include instructions that, when executed, cause the one or more processors to determine, for each of the first magnetic spacing measurement pattern and the second magnetic spacing measurement pattern, a respective first harmonic tone based on the signal, and determine, for each of the first magnetic spacing measurement pattern and the second magnetic spacing measurement pattern, a respective second harmonic tone based on the signal. The computer-readable storage medium also may include instructions that, when executed, cause the one or more processors to determine, for each of the first magnetic spacing measurement pattern and the second magnetic spacing measurement pattern, a ratio of the respective first harmonic tone and the respective second harmonic tone, determine a maximum ratio, and utilize the maximum ratio to determine a relative spacing between the read head and a surface of the magnetic data storage device.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques for determining a relative spacing between a read head and a surface of a magnetic data storage device using at least two magnetic spacing measurement patterns on the magnetic data storage device. A first magnetic spacing measurement pattern may be offset from a center of a data track by a first offset value and a second magnetic spacing measurement pattern may be offset from the center of the data track by a second, different offset value. The read head sensor may sense the first magnetic spacing measurement pattern and the second magnetic spacing measurement pattern. Each of the magnetic spacing measurement patterns may have the same pattern of magnetic transitions, which may produce tones. A processor of the data storage device may determine a first harmonic tone and a second harmonic tone from each of the first and second magnetic spacing measurement patterns. In some examples, the processor also may determine a respective amplitude for each of the harmonic tones, and respective ratios between the amplitudes of the first and second harmonic tones for each of the first and second magnetic spacing measurement patterns. The processor may determine whether the first magnetic spacing measurement pattern or the second magnetic spacing measurement pattern results in a greater ratio between the first and second harmonic tones, and may utilize the greater ratio when determining relative spacing between the read head and the surface of the magnetic data storage device.

Track mis-registration (TMR) effects may cause radial misalignment between the read head and the center of the data track during reading of the magnetic spacing measurement patterns, and the magnetic spacing measurement patterns may have a magnetic field strength that decreases away from the center of the data track. Hence, TMR effects may cause errors in reading a magnetic spacing measurement pattern where, for example, the magnetic spacing measurement pattern is located only at the center of the data track. The errors in reading the magnetic spacing measurement pattern may lead to errors in determining the relative spacing between the read head and the surface of the magnetic data storage device, as the read head may sense lower magnetic field values for the magnetic spacing measurement pattern leading to the processor determining erroneous amplitudes for the first and second harmonic tones. In accordance with examples of this disclosure, by utilizing at least two measurement magnetic spacing patterns having different offsets relative to a center of a data track, the effects of TMR on reading the magnetic spacing measurement patterns may be reduced or substantially eliminated (e.g., eliminated or nearly eliminated), thus improving the accuracy of the magnetic spacing measurement.

Figure 1:
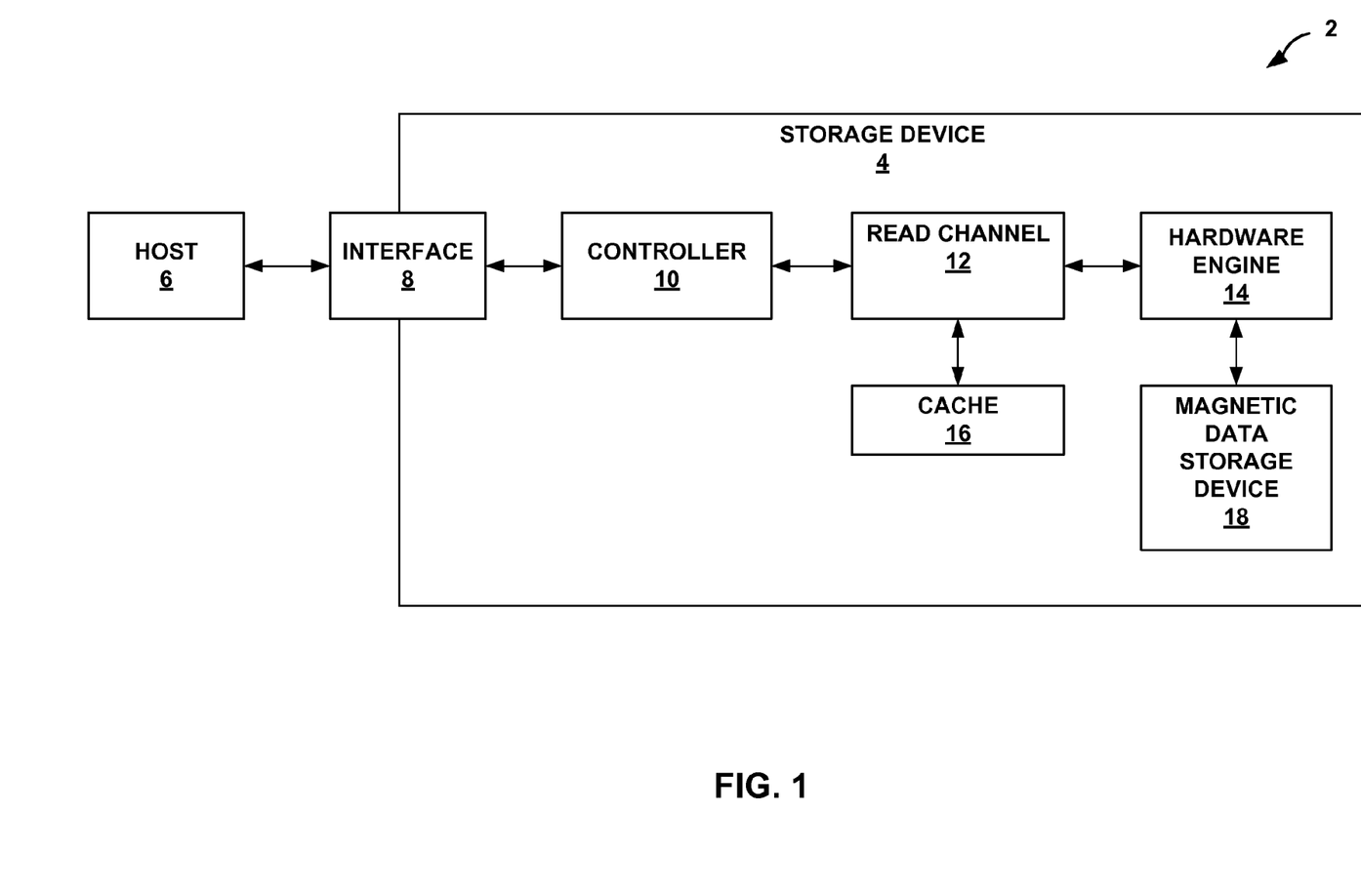
FIG. 1 is a conceptual and schematic block diagram illustrating an example storage environment in which a storage device may interact with a host device, in accordance with one or more techniques of this disclosure.

FIG. 1 is a conceptual and schematic block diagram illustrating an example storage environment 2 in which storage device 4 may interact with a host device 6, in accordance with one or more techniques of this disclosure. For instance, host device 6 may store data on or retrieve data from storage device 4. In some examples, storage environment 2 may include a plurality of storage devices, such as storage device 4, which may operate as a storage array. For instance, storage environment 2 may include a plurality of storage devices 4 configured as a redundant array of inexpensive/independent disks (RAID) that collectively function as a mass storage device for host device 6. While techniques of this disclosure generally refer to storage environment 2 and storage device 4, techniques described herein may be performed in any storage environment that utilizes tracks of data.

As illustrated in FIG. 1, host device 6 may communicate with storage device 4 via interface 8. Host device 6 may include any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Host device 6 may include any device having a processing unit, which may refer to any form of hardware capable of processing data and may include a general purpose processing unit (such as a central processing unit (CPU), dedicated hardware (such as an application specific integrated circuit (ASIC)), configurable hardware such as a field programmable gate array (FPGA) or any other form of processing unit configured by way of software instructions, microcode, firmware, or the like.

As illustrated in FIG. 1 storage device 4 may include an interface 8, a controller 10, a read channel 12, a hardware engine 14, a cache 16, and a magnetic data storage device 18. Some examples of storage device 4 may include additional components not shown in FIG. 1 for ease of illustration. For example, storage device 4 may include power delivery components such as a capacitor, super capacitor, battery, or the like; a printed board (PB) to which at least some components of storage device 4 are mechanically attached and which includes electrically conductive traces that electrically interconnect components of storage device 4; or the like. In some examples, the physical dimensions and connector configurations of storage device 4 may conform to one or more standard form factors. Some example standard form factors may include 3.5" hard disk drive (HDD), 2.5" HDD, or 1.8" HDD.

Storage device 4 may include interface 8 for interfacing with host device 6. Interface 8 may include one or both of a data bus for exchanging data with host device 6 and a control bus for exchanging commands with host device 6. Interface 8 may operate in accordance with any suitable protocol. For example, interface 8 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), and PCI-express (PCIe). The electrical connection of interface 8 (e.g., the data bus, the control bus, or both) is electrically connected to controller 10, providing electrical connection between host device 6 and controller 10, allowing data to be exchanged between host device 6 and controller 10. In some examples, the electrical connection of interface 8 may also permit storage device 4 to receive power from host device 6.

Storage device 4 may include controller 10 to manage one or more operations of storage device 4. Controller 10 may interface with host device 6 via interface 8 and manage the storage of data to and the retrieval of data from magnetic data storage device 18 accessible via hardware engine 14. Controller 10 may, as one example, manage writes to and reads from the magnetic data storage device 18. In some examples, controller 10 may be a hardware controller. In other examples, controller 10 may be implemented into storage device 4 as a software controller. Controller 10 may further include one or more features that perform techniques of this disclosure.

In the example of FIG. 1, storage device 4 includes read channel 12, which may represent the electrical circuit responsible for transforming the physical magnetic flux signal sensed by hardware engine 14 into bits of data. In other words, hardware engine 14 physically reads the data stored by magnetic data storage device 18, controller 10 may control read channel 12 to receive a signal from hardware engine 14, and read channel 12 may convert the magnetic flux into bits useable by host device 6. In this way, read channel 12 may, as one example, manage reads from the magnetic data storage device 18. Read channel 12 may be a single electronic circuit or an integrated circuit, for example, as part of a storage system-on-a-chip. Read channel 12 may further include one or more features that may perform techniques of this disclosure, such as determining relative spacing between a read head of hardware engine 14 and a surface of magnetic data storage device 18 using the magnetic spacing measurement pattern techniques described herein.

Host device 6 may, in this respect, interface with various hardware engines, such as hardware engine 14, to interact with various sensors. Host device 6 may execute software, such as the above noted operating system, to manage interactions between host device 6 and hardware engine 14. The operating system may perform arbitration in the context of multi-core CPUs, where each core effectively represents a different CPU, to determine which of the CPUs may access hardware engine 14. The operating system may also perform queue management within the context of a single CPU to address how various events, such as read and write requests in the example of storage device 4, issued by host device 6 should be processed by hardware engine 14 of storage device 4.

In the example of FIG. 1, storage device 4 includes hardware engine 14, which may represent the hardware responsible for interfacing with magnetic data storage device 18. Hardware engine 14 may, in the context of a platter-based hard disk drive, represent the magnetic read head or read/write head. Although described in the following examples as being performed in the context of a hard disk drive, the techniques described in this disclosure may be extended to any type of hardware engine.

In the example of FIG. 1, magnetic data storage device 18 may be operable to store information for processing during operation of storage device 4. For instance, storage device 4 may store data that controller 10 may access during execution at storage device 4. In some examples, magnetic data storage device 18 represents a magnetic data storage disk or a magnetic data storage tape configured for long-term storage of information. The density of data on magnetic data storage device 18 is correlated to the spacing between a surface of magnetic data storage device 18 and the read head, which may be referred to as the read head fly-height. Reduction in read head fly-height increases the precision with which the read head can sense the magnetic transitions on magnetic data storage device 18, thereby allowing smaller data tracks and effectively increasing the areal density of data stored by magnetic data storage device 18. However, if the read head fly-height deviates from the designed or initial height, the read head may be less effective in sensing the magnetic transitions on magnetic data storage device 18, which may lead to read errors. Further, as data tracks of magnetic data storage device 18 are narrowed, the magnetic transitions have increased curvature, which may cause the read head to experience reading error as a result of TMR effects. TMR effects may be due to random positional error in normal operation of the read head, system vibration, disk slip introducing repeatable runout, variation of the read head servo positioning field measurements by sensor instability, or the like.

TMR effects may also affect measurement of relative read head fly-height. In some examples, controller 10 or read channel 12 may determine relative read head fly-height using a magnetic spacing measurement pattern written to a data wedge of a data track of magnetic data storage device 18. The magnetic spacing measurement pattern may include a pattern of magnetic transitions corresponding to a signal having a tone. The magnetic spacing measurement pattern may have a period of, for example, 8, 10, or 12 channel write clock periods, and may be constructed using 1T or 2T magnet lengths. In some examples, the magnetic spacing measurement pattern may be selected to include periodic sequences of short magnets having primary harmonic tones within the lower ⅔ of the read pass band. This may reduce or substantially avoid introducing error in the spacing measurement due to variation in electronic circuits or filters. A binary representation of the magnetic spacing measurement pattern may include, for example, 11010010, 0001011101, 110101001010, or the like. In some examples, the magnetic spacing measurement pattern, or plurality of magnetic spacing measurement patterns, may be written to a narrow band of a data track, or narrow bands of data tracks, and may be designed to retain signal amplitude for the life of the magnetic data storage device 18.

Read channel 12 (or controller 10) may receive a signal indicative of the magnetic spacing measurement pattern and apply a Fourier Transform, such as a Fast Fourier Transform (FFT) or a Discrete Fourier Transform (DFT) to determine a first harmonic tone of the signal and a second harmonic tone of the signal. In some examples, the first harmonic tone may be a fundamental harmonic frequency and the second harmonic tone may be a higher order harmonic, such as a third harmonic frequency. Read channel 12 (or controller 10) then may determine the amplitude of the first harmonic tone and an amplitude of the second harmonic tone and a ratio of the amplitude of the first harmonic tone and the amplitude of the second harmonic tone. The ratio of the amplitudes may be a measure of the spacing between the read head and the surface of magnetic data storage device 18. For example, a Fourier transform of a binary sequence may be represented by:

$$V(k) = V_{sp}(k) \sum_n (-1)^n e^{ikBn}$$

where "$V_{sp}(k)$" can be the Fourier transform of a step transition, which may be expressed as:

$$V_{sp}(k) = C \frac{1 - e^{-k\delta}}{k} \frac{\sin(1.11 \text{ kg}/2)}{(1.11 \text{ kg}/2)} e^{-k(d+a)}$$

where "k" may be a harmonic frequency, "δ" may be a magnetic media thickness, "g" may be a read gap length, "d" may be a magnetic spacing, and "a" may be a transition parameter. If "F" is represented by:

$$F = \frac{1 - e^{-k\delta}}{k} \frac{\sin\left(\frac{1.11 \text{ kg}}{2}\right)}{\left(\frac{1.11 \text{ kg}}{2}\right)} * \sum_n (-1)^n e^{ikBn}$$

then the amplitude "$V_1$" of the first measured harmonic (e.g., a fundamental harmonic frequency) with wavelength "$\lambda_1$" may be represented by:

$$V_1 = F_1 e^{-2\pi(d+a)/\lambda_1}$$

where "$F_1$" is evaluated for the first harmonic frequency "$k_1$". Furthermore, the intensity "$V_3$" of the second measured harmonic (e.g., a third harmonic frequency of the fundamental harmonic frequency) with wavelength "$\lambda_3$" may be represented by:

$$V_3 = F_3 e^{-2\pi(d+a)/\lambda_3}$$

where "$F_3$" is evaluated for the third harmonic frequency "$k_3$". Therefore, the magnetic spacing "d" plus a transition parameter "a" can be represented by:

$$d + a = \left(\frac{3\lambda_3}{4\pi}\right) Ln\left(\frac{V_1}{V_3}\right) + \left(\frac{3\lambda_3}{4\pi}\right) Ln\left(\frac{F_3}{F_1}\right)$$

In some examples, the second term on the right-hand side of this equation may be referred to as a correction term and may be approximately equal to zero when the wavelength used for testing is selected appropriately based on the values of the read gap length, g, the magnetic media thickness, δ, and the write pattern used. In this way, read channel 12 (or controller 10) may determine the ratio of the amplitudes of the first and second harmonic tones, which may be used in the above equation to measure of the spacing "d" between the read head sensor and the surface of magnetic storage device 18.

Because the read head fly-height measurement relies on transitions between magnetic domains to generate the harmonic tones and the transitions between the magnetic domains are curved, TMR effects may result in the amplitude of the signal representative of the magnetic spacing measurement pattern being lower than a maximum amplitude value. For example, if the read head is positioned at a location offset from a center of the data track (e.g., in the radial direction of a disk or transverse to a longitudinal direction of the track in a tape), transitions between magnetic domains may be sensed by the read head to be different than if the read head is positioned at the center of the data track. This may result in read channel 12 (or controller 10) determining a different ratio between the first harmonic and the second harmonic depending on the position of the read head relative to the center of the data track. In some examples, the ratio calculated by read channel 12 (or controller 10) when the read head is positioned at the location offset from the center of the data track may produce a read head fly-height measurement value that indicates a greater spacing between the read head and the surface of magnetic data storage device 18 than the actual read head fly-height.

In some examples, instead of including a single magnetic spacing measurement pattern in a data wedge of a data track, magnetic data storage device 18 may include at least two magnetic spacing measurement patterns in a data wedge of a data track. A first magnetic spacing measurement pattern may be offset from a center of the data track (e.g., in a radial direction of a disk or transverse to a longitudinal direction of the track in a tape) by a first offset value. A second magnetic pattern may be offset from the center of the data track by a second, different offset value. Read channel 12 (or controller 10) may be configured to control the read head (of hardware engine 14) to sense the first and second magnetic spacing measurement patterns by passing the read head over the data track including the first and second magnetic measurement patterns. In some examples, hardware engine 14 receives from the read head first and second analog signals representative of the first and second magnetic spacing measurement patterns, respectively. Read channel 12 receives the analog signal and transforms the analogue signal to a digital signal. In other examples, read channel 12 operates on the analog signal directly, without first transforming the analog signal to a digital signal.

In some examples, read channel 12 (or controller 10) may apply a DFT, such as an FFT, to transform the analog or digital signals representative of the first and second magnetic spacing measurement patterns from the time domain to the frequency domain. Read channel 12 (or controller 10) then may determine a respective first harmonic tone for the first magnetic spacing measurement pattern and the second magnetic spacing measurement pattern, and the respective amplitude of the respective first harmonic tones. In some examples, read channel also may determine a respective second harmonic tone for each of the first and second magnetic spacing measurement patterns, and the respective amplitude of the respective second harmonic tones. Read channel 12 (or controller 10) then may determine a ratio of the first harmonic tone and the second harmonic tone for each of the first and second magnetic spacing measurement patterns. In some examples, read channel 12 (or controller 10) also may determine which of the ratios is greater, and may use the greater ratio to determine the relative spacing between the read head and a surface of magnetic data storage device 18. In some examples, read channel 12 (or controller 10) may characterize and, optionally, control the read head fly-height based at least in part on the determined relative spacing.

Unlike using a single magnetic spacing measurement pattern that is centered on the data track, the techniques of this disclosure utilizing a plurality of magnetic spacing patterns offset from a center of the data track (e.g., in a radial direction of a magnetic data storage disk or transverse to a longitudinal direction of the track in a magnetic data storage tape) by different offset values may enable a more consistent measurement of read head fly-height that may accommodate TMR effects. For example, if the read head is mis-aligned and not over the center of the data track, or if other TMR effects are present, read channel 12 (or controller 10) may utilize the maximum ratio, determined from the first magnetic spacing measurement pattern and the second magnetic spacing measurement pattern at different offsets with respect to the center of the data track, to determine the relative spacing between the read head and a surface of the magnetic data storage device. In this way, the techniques of this disclosure may allow measurement of the relative read head fly-height in the presence of TMR effects.

Figure 2:
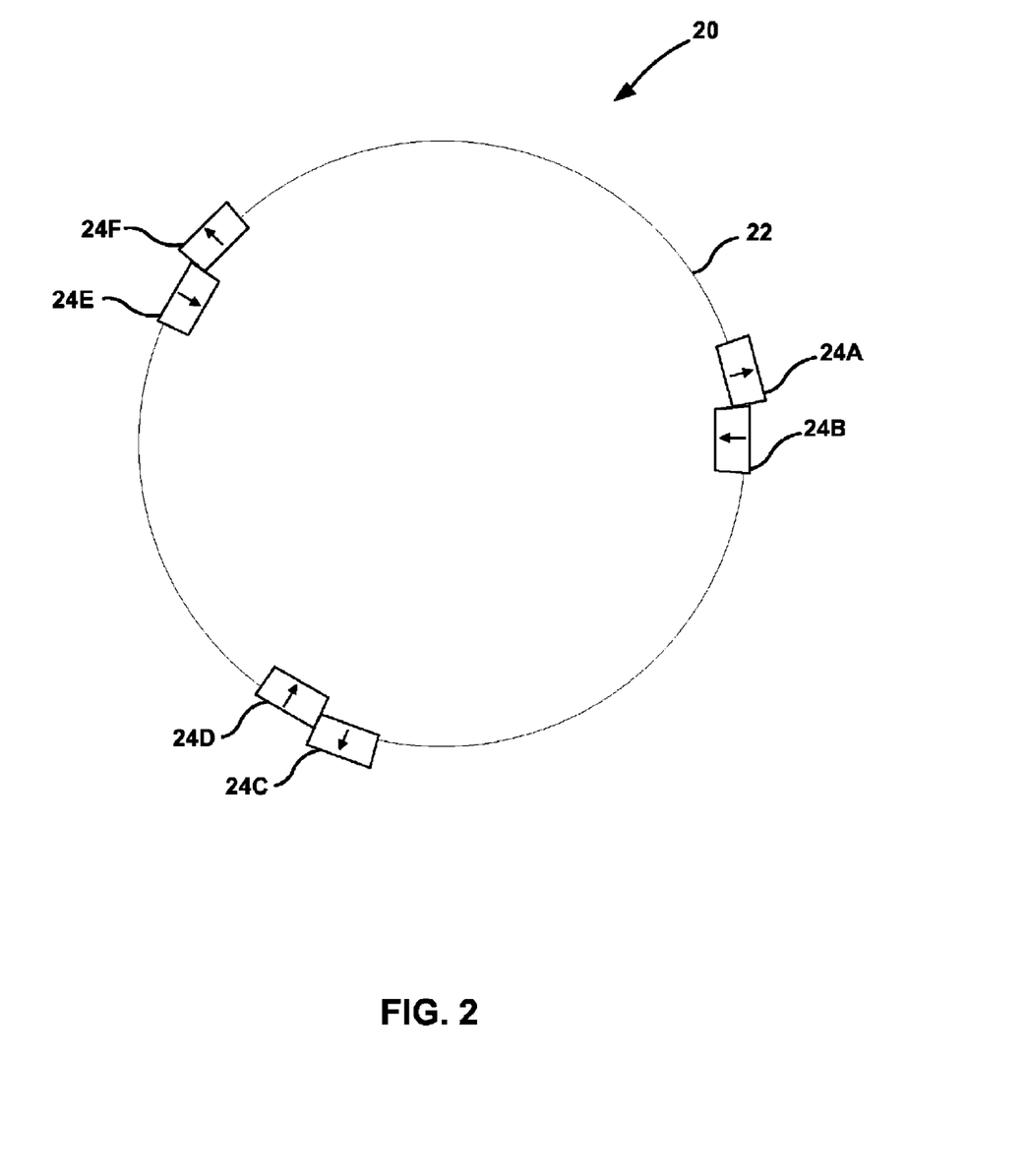
FIG. 2 is a conceptual diagram illustrating an example magnetic data storage device including a data track having a plurality of magnetic spacing measurement patterns offset from a center of the data track by different offset values, in accordance with one or more techniques of this disclosure.

In some examples, read channel 12 may determine a relative read head fly-height at each of a plurality of positions around the circumference of a magnetic data storage disk or along a length of a magnetic data storage tape, or may utilize an average ratio of harmonic tones based on ratios determined for a plurality of positions around the circumference of a magnetic data storage disk or along a length of a magnetic data storage tape. Utilizing multiple ratios to determine an average ratio may account for variations in read head fly-height as a function of position, may improve accuracy of the measurement, or both. FIG. 2 is a conceptual diagram illustrating an example magnetic data storage device that includes a magnetic data storage disk 20. Magnetic data storage disk 20 includes a data track 22 having a plurality of magnetic spacing measurement patterns 24A, 24B, 24C, 24D, 24E, and 24F (collectively, "magnetic spacing measurement patterns 24") offset from a center of the data track 22, in accordance with one or more techniques of this disclosure.

Each of magnetic spacing measurement patterns 24 may include patterned transitions between magnetic domains corresponding to a signal having a tone. For example, each of magnetic spacing measurement patterns 24 may have a period of, for example, 8, 10, or 12 channel write clock periods, and may be constructed using 1T or 2T magnet lengths. In some examples, each of magnetic spacing measurement patterns 24 may be selected to include periodic sequences of short magnets having primary harmonic tones within the lower ⅔ of the read pass band. In some examples, each of magnetic spacing measurement patterns 24, may have a binary representation that may be selected to include, for example, 11010010, 0001011101, 110101001010, or the like. In some example, each of magnetic spacing measurement patterns 24 includes the same pattern of magnetic transitions. In other examples, at least one of magnetic spacing measurement patterns 24 has a different pattern of magnetic transitions that at least one other of magnetic spacing measurement patterns 24. In some examples, magnetic spacing measurement patterns 24 may be written to a narrow band of a data track, or narrow bands of data tracks, and may be designed to retain signal amplitude for the life of the magnetic data storage device 18.

The example of FIG. 2 illustrates the data track 22 having a plurality of magnetic spacing measurement patterns 24, each pattern being written to a data wedge of data track 22. The plurality of magnetic spacing measurement patterns 24 may be radially offset from the center of data track 22, as indicated by arrows pointing either to the radially inward of data track 22 or radially outward of data track 22. For example, an arrow pointing radially inward of data track 22 (i.e., toward the center of the magnetic data storage device 18) illustrates a positive radial offset, whereas an arrow pointing radially outward of data track 22 (i.e., away from the center of the magnetic data storage device 18) illustrates a negative radial offset.

In some examples, two or more magnetic spacing measurement patterns may be located in adjacent data wedges of data track 22. For instance, a first magnetic spacing measurement pattern 24A of a magnetic spacing measurement pattern grouping (e.g., patterns 24A and 24B) may be contiguous with (e.g., immediately adjacent to) at least a portion of a second magnetic spacing measurement pattern 24B of the same magnetic spacing measurement pattern grouping. Each of magnetic spacing measurement patterns of a magnetic spacing pattern grouping may be offset from the center of the data track 22 by a different offset value. For example, in FIG. 2 magnetic spacing measurement pattern 24A may be adjacent to magnetic spacing measurement pattern 24B, magnetic spacing measurement pattern 24A may be contiguous with at least a portion of magnetic spacing measurement pattern 24B, and magnetic spacing measurement pattern 24A may be radially offset to the outside of the data track 22, whereas magnetic spacing measurement pattern 24B may be radially offset to the inside of data track 22.

As shown in FIG. 2, magnetic data storage disk 20 may include magnetic spacing pattern groupings located at different circumferential positions around disk 20. For example, a second magnetic spacing pattern grouping may include third magnetic spacing measurement pattern 24C and fourth magnetic spacing measurement pattern 24D, and a third magnetic spacing pattern grouping may include fifth magnetic spacing measurement pattern 24E and sixth magnetic spacing measurement pattern 24F. Each of the magnetic spacing pattern groupings may include a first magnetic spacing measurement pattern offset by a first offset value and a second magnetic spacing measurement pattern offset by a second offset value. In some examples, the first offset value is the same for each of the magnetic spacing pattern groupings may be the same; in other examples, the first offset values may be different among the magnetic spacing pattern groupings. Similarly, in some examples, the second offset value is the same for each of the magnetic spacing pattern groupings may be the same; in other examples, the second offset values may be different among the magnetic spacing pattern groupings.

Although three magnetic spacing measurement pattern groupings are illustrated in FIG. 2, in other examples, a data track 22 may include more or fewer magnetic spacing measurement pattern groupings. In some examples, data track 22 may include a magnetic spacing measurement pattern grouping at or adjacent to each servo location. For example, data track 22 may include hundreds (e.g., 400) servo locations, and data track 22 may include a corresponding number of magnetic spacing measurement pattern groupings.

Further, although FIG. 2 illustrates magnetic spacing measurement patterns 24 all located within a single data track 22, in some examples, magnetic data storage disk 20 may include magnetic spacing measurement patterns 24 in different tracks located at different diameters of magnetic data storage disk 20. For example, magnetic data storage disk 20 may include at least one magnetic spacing measurement pattern or magnetic spacing measurement patterns grouping near an inner diameter of magnetic data storage disk 20, at least one magnetic spacing measurement pattern or magnetic spacing measurement patterns grouping near an outer diameter of magnetic data storage disk 20, and a magnetic spacing measurement pattern or magnetic spacing measurement pattern grouping near a middle diameter of magnetic data storage disk 20.

In examples in which magnetic data storage disk 20 includes magnetic spacing measurement pattern groupings at different circumferential locations, diametrical locations, or both, read channel 12 may control the read head sensor of hardware engine 14 to read all the magnetic spacing measurement patterns 24. For each magnetic spacing measurement pattern grouping, read channel 12 may determine the ratio of first and second harmonic tones for each of the magnetic spacing measurement patterns 24. Read channel 12 then may select the respective maximum ratio for each magnetic spacing measurement pattern grouping and utilize the respective maximum ratios for determining the relative read head fly-height. By utilizing multiple ratios to determine an average ratio, read head 12 may account for variations in read head fly-height as a function of position, may improve accuracy of the read head fly-height measurement, or both.

Figure 3:
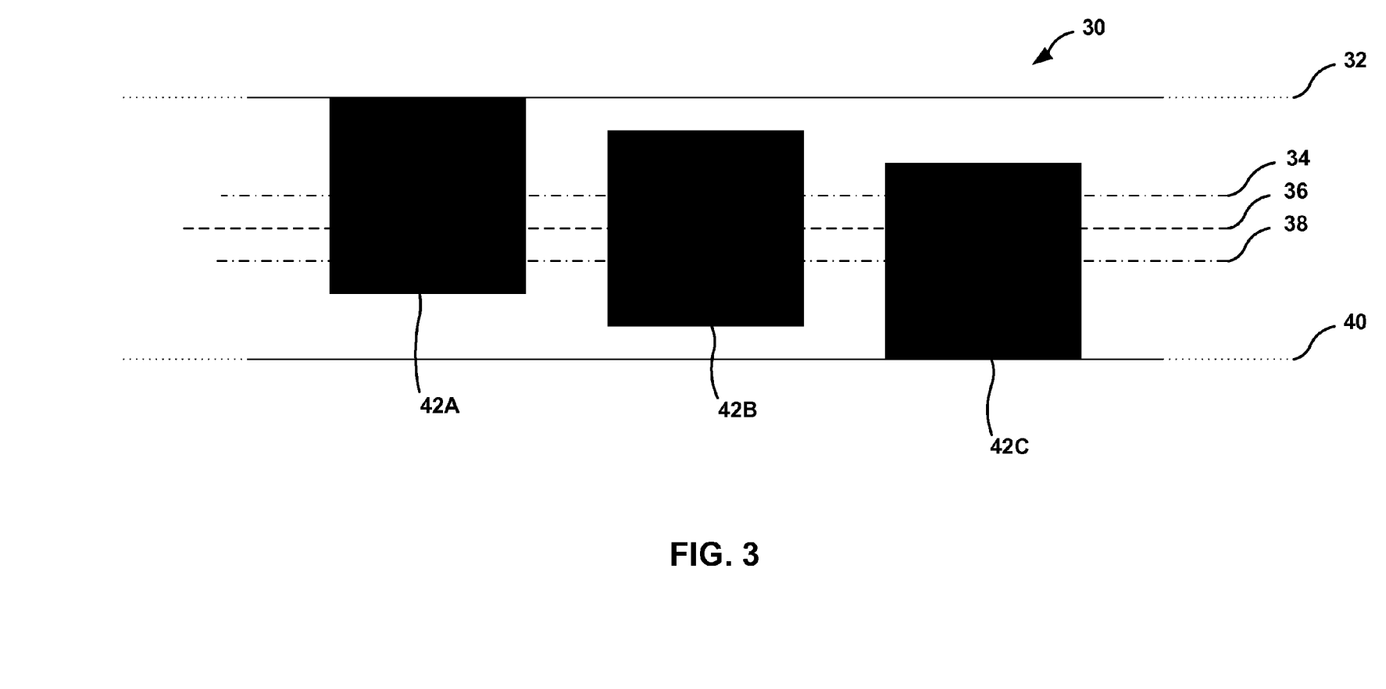
FIG. 3 is a conceptual diagram illustrating an example segment of a data track including a plurality of magnetic spacing patterns offset from a center of the data track by different offset values, in accordance with one or more techniques of this disclosure.
Figure 4:
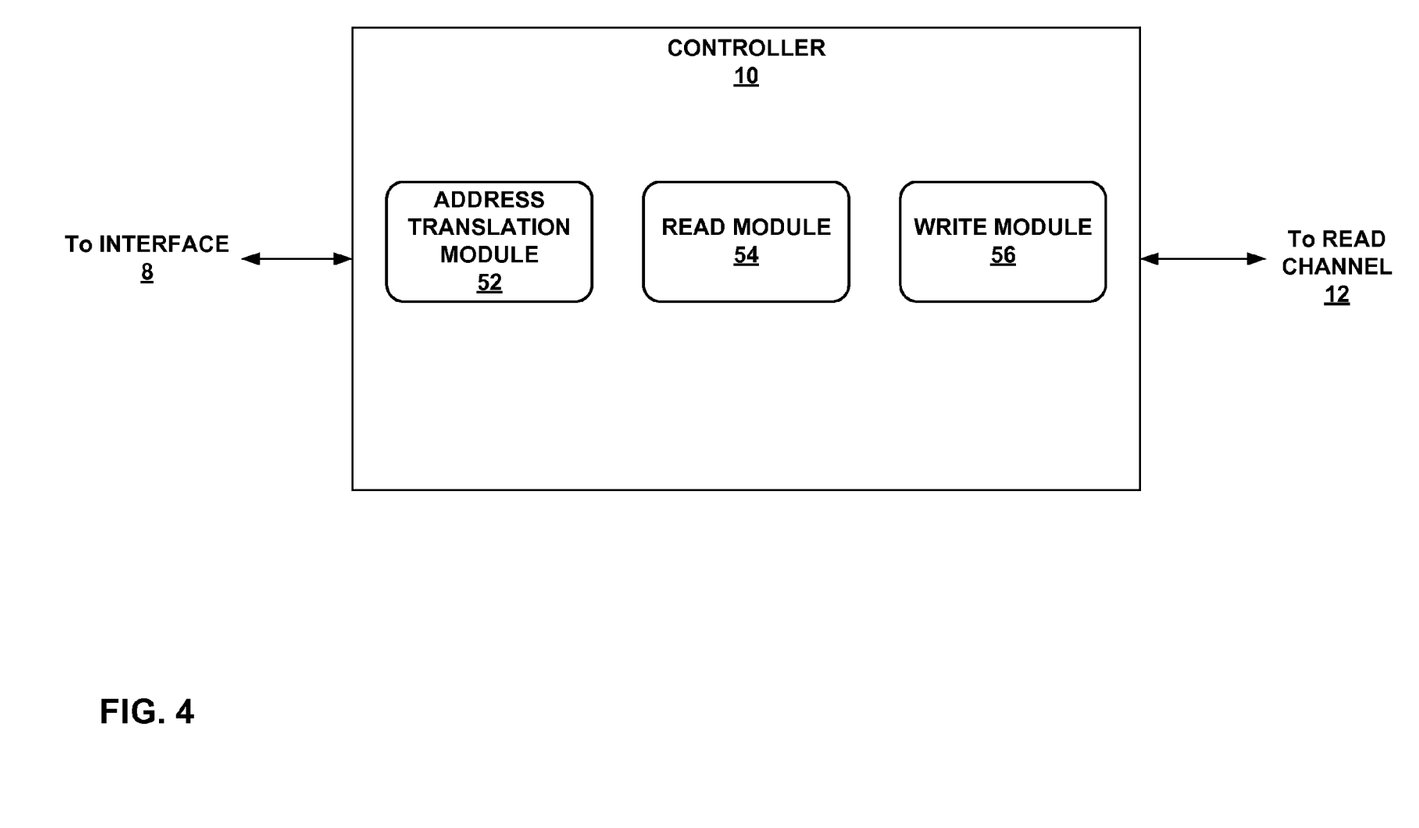
FIG. 4 is a conceptual and schematic block diagram illustrating an example controller, in accordance with one or more techniques of this disclosure.

In some examples, instead of including two magnetic spacing measurement patterns, a magnetic spacing measurement pattern grouping may include more than two magnetic spacing measurement patterns. For example, FIG. 3 is a conceptual diagram illustrating an example segment of a data track 30 including a plurality of magnetic spacing measurement patterns 42A-42C (collectively, "magnetic spacing measurement patterns 42") offset from a center of data track 30, in accordance with one or more techniques of this disclosure. Data track 30 in FIG. 4 illustrates a segment of magnetic data storage device 18 that may be, for example, a curved segment of a magnetic data storage disk or a linear segment of a magnetic data storage tape. Data track 30 has an outer edge 32 corresponding to a positive distance from a center of the data track 30 and an inner edge 40 corresponding to a negative distance from the center of data track 30. Outer edge 32 and inner edge 40 may define the boundaries of data track 30. Data track 30 also may have a positive DAC step offset 34, a nominal (zero) DAC step offset 36, and a negative DAC step offset 38. Data track 30 may include a plurality of magnetic domains (not shown), with transitions between magnetic domains representing bits of data.

Magnetic spacing measurement patterns 42 may be written to data wedges on data track 30, and may together constitute a magnetic spacing measurement pattern grouping. Each of magnetic spacing measurement patterns 42 may include a pattern of magnetic transitions corresponding to a signal having a tone, as described with respect to FIG. 2. Each of magnetic spacing measurement patterns 42 may be contiguous with at least a portion of an adjacent one of magnetic spacing measurement patterns 42 or, as shown in FIG. 4 for clarity, each of magnetic spacing measurement patterns 42 may be discontiguous.

Each of magnetic spacing measurement patterns 42 may be radially offset from the center of the data track 30 by a different offset value. Magnetic spacing measurement pattern 42A, for example, may be offset in the positive direction such that magnetic spacing measurement pattern 42A is centered on a positive track offset 34. Magnetic spacing measurement pattern 42B, for example, may have a nominal or zero offset such that magnetic spacing measurement pattern 42B is centered on data track 30 and centered on the nominal (zero) track offset 36. Magnetic spacing measurement pattern 42C, for example, may be offset in the negative direction such that the magnetic spacing measurement pattern 42C is centered on a negative track offset 38. In some examples, the positive track offset 34 may be plus 512 DAC steps, relative to a track pitch of 4096 DAC steps. In some examples, the negative track offset 38 may be minus 512 DAC steps, relative to a track pitch of 4096 DAC steps. In some examples, the nominal track offset 36 may be zero DAC steps.

FIG. 4 is a conceptual and schematic block diagram illustrating an example controller 10, in accordance with one or more techniques of this disclosure. In some examples, controller 10 may include an address translation module 52, a read module 54, and a write module 56. In other examples, controller 10 may include additional modules or hardware units, or may include fewer modules or hardware units. Controller 10 may include a microprocessor, digital signal processor (DSP), application specific integrated circuit (ASIC), field programmable gate array (FPGA), or other digital logic circuitry. In some examples, controller 10 may be a system on a chip (SoC).

Controller 10 may interface with the host device 6 via interface 8 and manage the storage of data to and the retrieval of data from a magnetic data storage device 18. For example, write module 56 of controller 10 may receive a message from host device 6 via interface 8 instructing storage device 6 to store data associated with a logical address and the data and may manage writes to the magnetic data storage device 18.

In some examples, hardware engine 14 includes a write head configured to write a first and a second magnetic spacing measurement patterns to the magnetic data storage device 18. For example, write module 56 may communicate with address translation module 52, which manages translation between logical addresses used by host device 6 to manage storage locations of data and physical block addresses used by write module 56 to direct writing of the magnetic spacing measurement patterns to magnetic data storage device 18. Address translation module 52 of controller 10 may utilize a translation layer or table that translates logical addresses of data stored by magnetic data storage device 18 to physical addresses of data stored by magnetic data storage device 18. For example, host device 6 may utilize the logical addresses of the data stored by magnetic data storage device 18 in instructions or messages to storage device 6, while write module 46 utilizes physical addresses of the data to control writing of data to magnetic data storage device 18. The physical addresses correspond to actual, physical data wedges on magnetic data storage device 18.

Read module 54 similarly may control reading of data from magnetic data storage device 18. For example, read module 44 may receive a message from host device 6 requesting data with an associated logical address. Address translation module 52 may convert the logical address to a physical address using the translation layer or table. Read module 54 then may control a read channel 12 to retrieve the data from the physical block addresses via hardware engine 14.

Figure 5:
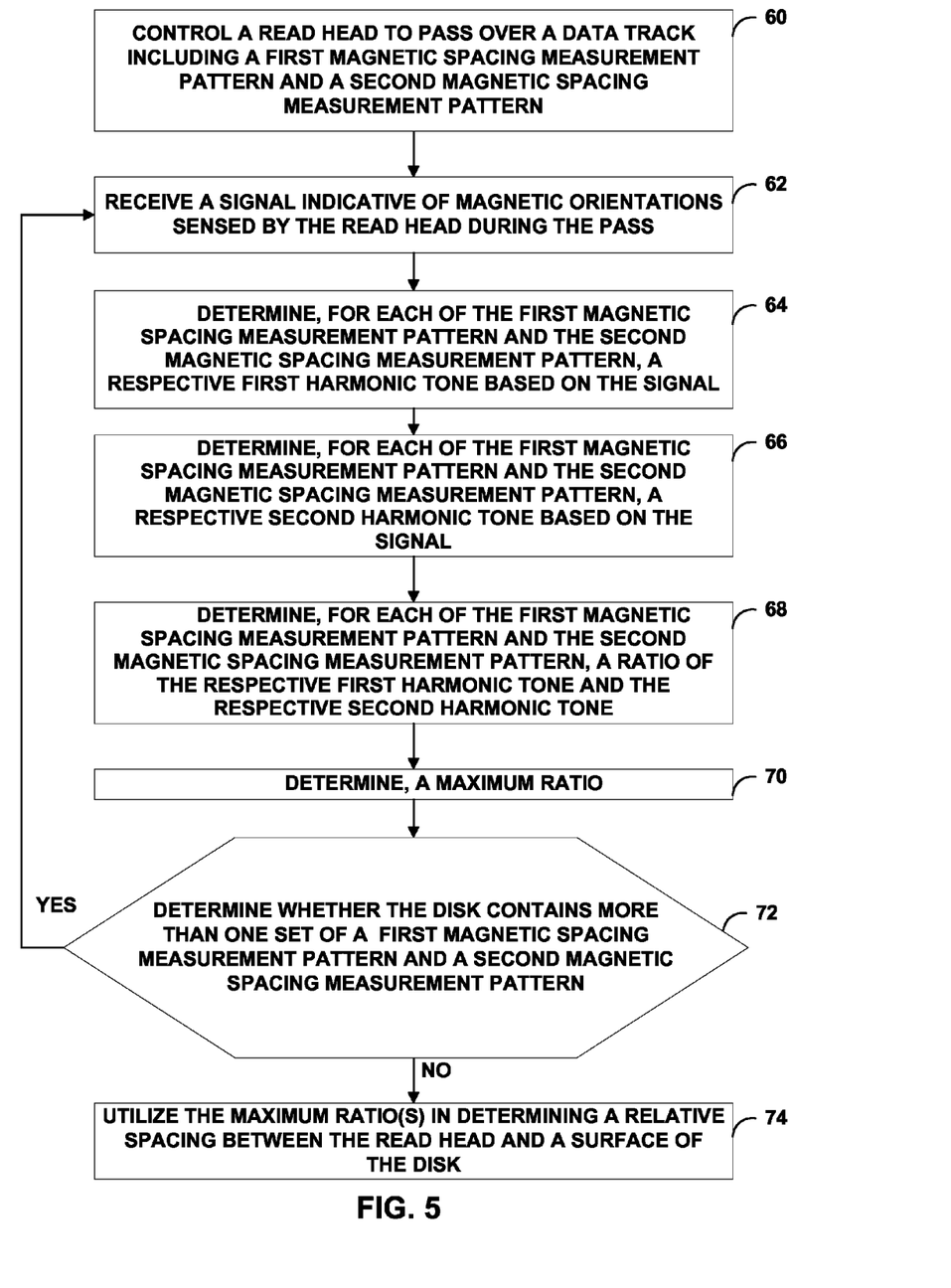
FIG. 5 is a flow diagram illustrating an example technique for determining a relative spacing between a read head and a surface of a magnetic data storage device, in accordance with one or more techniques of this disclosure.

FIG. 5 is a flow diagram illustrating an example technique for determining a relative spacing between a read head and a surface of a magnetic data storage device, in accordance with one or more techniques of this disclosure. Various modules (e.g., controller 10, read channel 12, or the like) of a storage device 4 may perform various techniques described in this disclosure. The technique of FIG. 5 will be described with respect to storage environment 2 of FIG. 1 and controller 10 and read channel 12 of FIGS. 1 and 4 for purposes of illustration. However, it will be understood that the technique of FIG. 5 may be performed by a different processor or in a different storage environment, and that controller 10 and storage environment 2 may perform other techniques.

In some examples, read channel 12 may control a read head sensor (of hardware engine 14) to pass over a data track 22 including at least a first magnetic spacing measurement pattern 24A and a second magnetic spacing measurement pattern 24B (60). In some examples, first magnetic spacing measurement pattern 24A is located at a positive radial offset and second magnetic spacing measurement pattern 24B is located at a negative radial offset relative to the center of data track 22. As described above, in some instances, the read head sensor may not be perfectly centered over data track 22, e.g., due to TMR effects. By including at least two magnetic measurement spacing patterns each having a different radial offset from the center of the track, the effect of any TMR effects on the read head fly-height measurement may be reduced or substantially eliminated.

In some examples, as described above, data track 22 may include a plurality of magnetic spacing measurement pattern groupings, and each of the magnetic spacing measurement pattern groupings may include at least two magnetic spacing measurement patterns located at different offset positions. Read channel 12 may control the read head sensor (of hardware engine 14) to pass over a data track 22 including the plurality of magnetic spacing measurement pattern groupings or multiple data tracks 22 (e.g., near an inner diameter, a middle diameter, an outer diameter, or the like) each including at least one magnetic spacing measurement pattern grouping.

The technique of FIG. 5 also includes receiving, by read channel 12, a signal indicative of magnetic transitions sensed by the read head during the pass (62). For instance, the signal may be an analogue signal or a digital signal, and may include a harmonic tone. In some examples in which magnetic data storage device 18 includes a plurality of magnetic spacing measurement pattern groupings, read channel 12 may conceptually receive a separate signal indicative of magnetic transitions sensed by the read head during the pass for each of the magnetic spacing measurement pattern groupings.

In some examples, read channel 12 may determine, for each of the first magnetic spacing measurement pattern and the second magnetic spacing measurement pattern, a respective first harmonic tone based on a signal (64). For example, read channel 12 may determine a Fourier Transform of the signal and determine the respective first harmonic tones based on the Fourier Transform. In some examples, the first harmonic tone may be a fundamental harmonic frequency of the signal. In some examples, read channel 12 also may determine, for each of the first magnetic spacing measurement pattern and the second magnetic spacing measurement pattern, a respective second harmonic tone based on a second signal (66). For example, read channel 12 may determine a Fourier Transform of the signal and determine the respective second harmonic tone based on the Fourier Transform. In some examples, the second harmonic tone may be a third harmonic frequency of a fundamental harmonic frequency of the second signal.

The technique of FIG. 5 also includes determining, for each of the first magnetic spacing measurement pattern and the second magnetic spacing measurement pattern, a ratio of the respective first harmonic tone and the respective second harmonic tone (68).

In some examples, read channel 12 may determine a maximum ratio (70) of the ratios determined for each of the magnetic spacing measurement patterns in a magnetic spacing measurement pattern grouping. For instance, the maximum ratio may be determined for the first harmonic and second harmonic determined from the first signal and second signal received by reading a first magnetic spacing measurement pattern and a second magnetic spacing measurement pattern. In some examples, the magnetic spacing measurement pattern from which the signal with the maximum ratio was sensed may correspond to the magnetic spacing measurement pattern over which the read head most directly passed during the read sensing.

In some examples, read channel 12 may determine whether magnetic data storage device 18 includes an additional magnetic spacing measurement pattern grouping (72).

In response to determining that magnetic data storage device 18 includes at least one more magnetic spacing measurement pattern grouping (YES branch of 72), read channel 12 may repeat steps 62, 64, 66, 68, and 70 for the next magnetic spacing measurement pattern grouping to determine a maximum ratio for that magnetic spacing measurement pattern grouping. Read channel 12 may repeat this technique until read channel 12 determines that a maximum ratio has been determined for each magnetic spacing measurement pattern grouping on magnetic data storage device 18. In some examples, such as when magnetic data storage device 18 includes magnetic spacing measurement pattern groupings on different tracks, read channel 12 may repeat steps 62, 64, 66, 68, and 70 for each magnetic spacing measurement pattern grouping on a first track, control the read head to pass over a second data track (60), and repeat steps 62, 64, 66, 68, and 70 for each magnetic spacing measurement pattern grouping on the second track. Read channel 12 may repeat this technique for each data track that includes magnetic spacing measurement pattern groupings.

In response to determining that magnetic data storage device 18 does not include additional magnetic spacing measurement pattern groupings (i.e., no additional sets of magnetic spacing measurement patterns) (NO branch of 72), read channel 12 may utilize the maximum ratio(s) in determining a relative spacing between a read head and a surface of magnetic data storage device 18 (74), e.g., utilizing the equations set forth above. In some examples, read channel 12 may determine an average maximum ratio based on the respective maximum ratio determined for the respective magnetic spacing measurement pattern groupings. In other examples, read channel 12 may determine a relative spacing between the read head and the surface of magnetic data storage device 18 separately for each maximum ratio, and may average the respective relative spacings to determine an average relative spacing.

Figure 6:
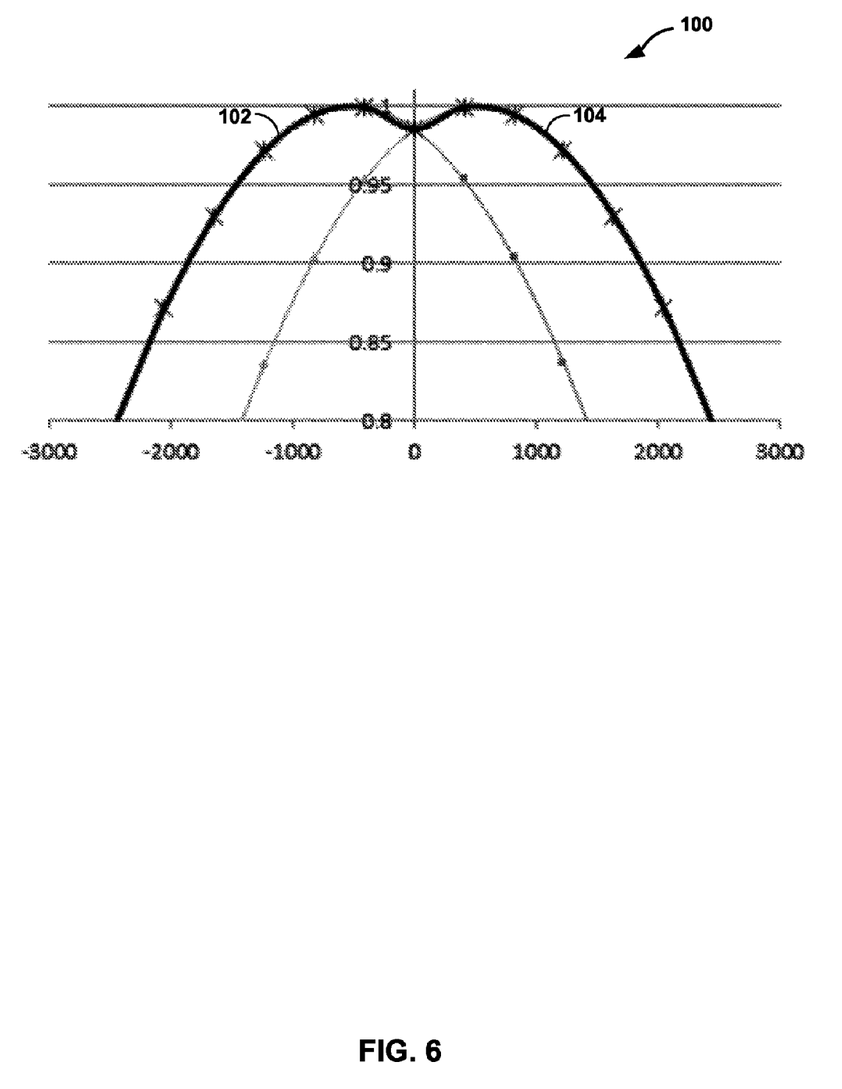
FIG. 6 is a diagram illustrating an example plot of a ratio of a first harmonic to a third harmonic versus offset from the center of a data track for two magnetic spacing test patterns, in accordance with one or more techniques of this disclosure.

FIG. 6 is a diagram illustrating an example plot of a ratio of a first harmonic to a third harmonic versus offset from the center of a data track for two magnetic spacing test patterns, in accordance with one or more techniques of this disclosure. As illustrated in FIG. 6, plot 100 may include a horizontal axis representing offset from a center of a data track in DAC step units, and a vertical axis representing a ratio corresponding to a resolution of a magnetic spacing measurement pattern signal.

In some examples, the ratio determined for two magnetic spacing measurement patterns may be plotted against offset position, where a ratio may be determined as a read head travels over a magnetic spacing measurement pattern at various offset positions. For instance, the apex of curve 102 and curve 104 corresponds to the offset position (i.e., location) of the magnetic spacing measurement relative to the center of the data track. For example, the magnetic spacing measurement pattern corresponding to curve 102 may be located at a negative 512 DAC steps, about negative 12.5 percent of track pitch, from the relative center of the data track. Also, for example, the magnetic spacing measurement pattern corresponding to the curve 104 may be located at a positive 512 DAC steps, about positive 12.5 percent of track pitch, from the relative center of the data track. The intersection of curve 102 and curve 104 may illustrate a decrease in ratio at the relative center of the data track (i.e., nominal offset value). Moreover, curve 102 illustrates a decrease in ratio as the read head approaches offset values less than about negative 500 DAC steps, whereas curve 104 may illustrate a decrease in the ratio as the read head approaches offset values more than about positive 500 DAC steps. As shown in FIG. 6, including two magnetic spacing measurement patterns each radially offset from a center of the data track may increase a width in the radial direction over which the ratio between the first and third harmonics is within a given percentage of the maximum ratio compared to examples in which only a single magnetic spacing measurement is used.

Figure 7:
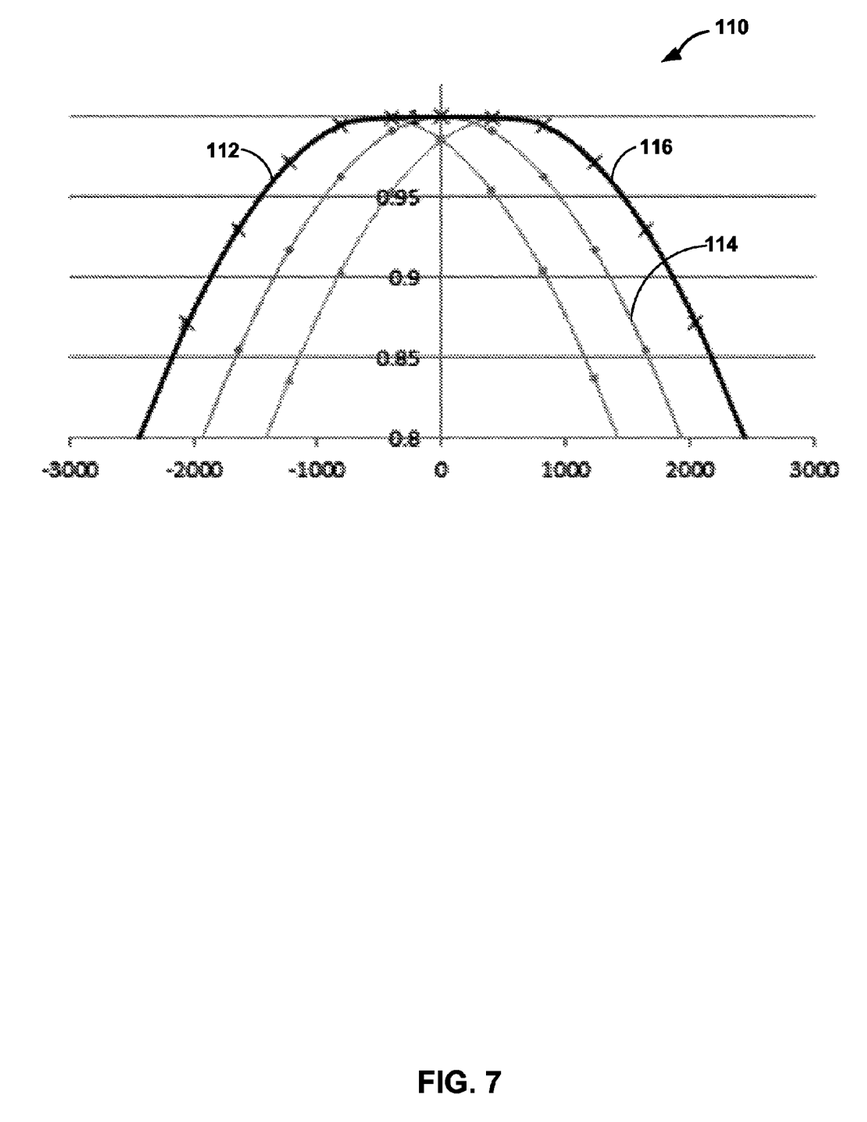
FIG. 7 is a diagram illustrating an example plot of ratio of a first harmonic to a third harmonic versus offset from the center of a data track for three magnetic spacing test patterns, in accordance with one or more techniques of this disclosure.

FIG. 7 is a diagram illustrating an example plot of ratio of a first harmonic to a third harmonic versus offset from the center of a data track for three magnetic spacing test patterns, in accordance with one or more techniques of this disclosure. As illustrated in FIG. 7, plot 110 may include a horizontal axis representing offset from a center of a data track in DAC step units, and a vertical axis representing a ratio corresponding to a resolution of a magnetic spacing measurement pattern signal.

In some examples, the ratio determined for three magnetic spacing measurement patterns may be plotted against offset position, where a ratio may be determined as a read head travels over a magnetic spacing measurement pattern at various offset positions. For instance, the apex of curve 114 corresponds to the offset position (i.e., location) of the magnetic spacing measurement relative to the center of the data track. For example, the magnetic spacing measurement pattern corresponding to curve 114 may be located at a nominal offset position from the relative center of the data track. Also, for example, the magnetic spacing measurement pattern corresponding to curve 112 and curve 116 may be located at a negative 512 DAC steps and positive 512 DAC steps, respectively, relative to a center of the data track. The curve 114 may illustrate the ratio of a magnetic spacing measurement pattern with a nominal offset position relative to the center of a data track, having ratio that decreases as the read head travels toward either negative or positive offset positions. The broad, approximately horizontal, band extending from about negative 512 DAC steps to about positive 512 DAC steps may illustrate near uniform ratio of the magnetic spacing measurement patterns when the average maximum ratio of three magnetic spacing measurement patterns located at a negative, nominal, and positive radial offset position are utilized to determine the relative spacing of a read head.

As illustrated in FIG. 7, utilizing the average of three magnetic spacing measurement patterns at different radial offset positions on a data track may improve the accuracy of a read head spacing measurement in the presence of TMR effects. Hence, including three magnetic spacing measurement patterns each radially offset from a center of the data track by a different radial offset may increase a width in the radial direction over which the ratio between the first and third harmonics is within a given percentage of the maximum ratio compared to examples in which only a single magnetic spacing measurement is used.

What is claimed is:

1. A storage device comprising:
    a magnetic data storage device comprising a data track comprising a magnetic spacing measurement pattern grouping comprising a first magnetic spacing measurement pattern offset from a center of the data track by a first offset value and a second magnetic spacing measurement pattern offset from the center of the data track by a second, different offset value;
    a read head; and
    at least one processor configured to:
        control the read head to pass over the data track including the first magnetic spacing measurement pattern and the second magnetic spacing measurement pattern;
        receive a signal indicative of magnetic transitions sensed by the read head during the pass;
        determine, for each of the first magnetic spacing measurement pattern and the second magnetic spacing measurement pattern, a respective first harmonic tone based on the signal;
        determine, for each of the first magnetic spacing measurement pattern and the second magnetic spacing measurement pattern, a respective second harmonic tone based on the signal;
        determine, for each of the first magnetic spacing measurement pattern and the second magnetic spacing measurement pattern, a ratio of the respective first harmonic tone and the respective second harmonic tone;
        determine a maximum ratio; and
        utilize the maximum ratio to determine a relative spacing between the read head and a surface of the magnetic data storage device.

2. The storage device of claim 1, wherein the first magnetic spacing measurement pattern is located at a positive offset and the second magnetic spacing measurement pattern is located at a negative offset relative to the center of the data track.

3. The storage device of claim 1, further comprising a write head configured to write the first and second magnetic spacing measurement patterns to the magnetic data storage device.

4. The storage device of claim 1, wherein the first harmonic tone comprises a fundamental harmonic frequency and the second harmonic tone comprises a third harmonic frequency.

5. The storage device of claim 1, wherein the magnetic spacing measurement pattern grouping comprises three separate magnetic spacing measurement patterns, wherein the first magnetic spacing pattern is located at a positive offset relative to the center of the data track, the second magnetic spacing pattern is located at a zero offset relative to the center of the data track, and a third magnetic spacing pattern is located at a negative offset relative to the center of the data track.

6. The storage device of claim 1, wherein the maximum ratio comprises a first maximum ratio, wherein the signal comprises a first signal, wherein the magnetic spacing measurement grouping comprises a first magnetic spacing measurement grouping, wherein the magnetic data storage device comprising the data track further comprises a second magnetic spacing measurement grouping comprising a third magnetic spacing measurement pattern offset from the center of the data track by a third offset value and a fourth magnetic spacing measurement pattern offset from the center of the data track by a fourth, different offset value, wherein the first magnetic spacing measurement pattern grouping is located at a different circumferential position than the second magnetic spacing measurement pattern grouping, and wherein the at least one processor is further configured to:

control the read head to pass over the second magnetic spacing measurement pattern grouping;

receive a second signal indicative of magnetic transitions sensed by the read head during the pass over the third magnetic spacing measurement pattern and the fourth magnetic spacing measurement pattern;

determine, for each of the third magnetic spacing measurement pattern and the fourth magnetic spacing measurement pattern, a respective first harmonic tone based on the second signal;

determine, for each of the third magnetic spacing measurement pattern and the fourth magnetic spacing measurement pattern, a respective second harmonic tone based on the second signal;

determine, for each of the third magnetic spacing measurement pattern and the fourth magnetic spacing measurement pattern, a ratio of the respective first harmonic tone and the respective second harmonic tone;

determine a second maximum ratio; and utilize the second maximum ratio to determine a relative spacing between the read head and a surface of the magnetic data storage device.

7. The storage device of claim 6, wherein the processor is configured to utilize an average of the first maximum ratio and the second maximum ratio to determine a relative spacing between the read head and the surface of the magnetic data storage device.

8. The storage device of claim 6, wherein the at least one processor is further configured to control the read head spacing above the surface of the magnetic data storage device based on the relative spacing.

9. The storage device of claim 6, wherein the first harmonic tone comprises a fundamental harmonic frequency and the second harmonic tone comprises a third harmonic frequency of the fundamental harmonic frequency.

10. The storage device of claim 1, wherein the magnetic data storage device comprises a magnetic data storage disk, wherein the offset comprises a radial offset, wherein the first offset value comprises a first radial offset value, and wherein the second, different offset value comprises a second, different radial offset value.

11. A method comprising:

controlling, by at least one processor of a storage device, a read head to pass over a data track including a magnetic spacing measurement pattern grouping comprising a first magnetic spacing measurement pattern and a second magnetic spacing measurement pattern, wherein the first magnetic spacing measurement pattern is offset from a center of the data track by a first offset value, wherein the second magnetic spacing measurement pattern is offset from the center of the data track by a second, different offset value, and wherein a magnetic data storage device comprises the data track;

receiving, by the at least one processor, a signal indicative of magnetic transitions sensed by the read head during the pass;

determining, by the at least one processor, for each of the first magnetic spacing measurement pattern and the second magnetic spacing measurement pattern, a respective first harmonic tone based on the signal;

determining, by the at least one processor, for each of the first magnetic spacing measurement pattern and the second magnetic spacing measurement pattern, a respective second harmonic tone based on the signal;

determining, by the at least one processor, for each of the first magnetic spacing measurement pattern and the second magnetic spacing measurement pattern, a ratio of the respective first harmonic tone and the respective second harmonic tone;

determining, by the at least one processor, a maximum ratio; and     utilizing, by the at least one processor, the maximum ratio in determining a relative spacing between the read head and a surface of the magnetic data storage device.

12. The method of claim 11, wherein the first magnetic spacing measurement pattern is located at a positive offset relative to the center of the data track and the second magnetic spacing measurement pattern is located at a negative offset location relative to the center of the data track.

13. The method of claim 11, further comprising, controlling, by the at least one processor, a write head to write the first and second magnetic spacing measurements to the magnetic data storage device.

14. The method of claim 11, wherein the first harmonic tone comprises a fundamental harmonic frequency and the second harmonic tone comprises a third harmonic frequency of the fundamental harmonic frequency.

15. The method of claim 11, wherein the maximum ratio comprises a first maximum ratio, wherein the signal comprises a first signal, wherein the magnetic spacing measurement pattern grouping comprises a first magnetic spacing measurement pattern grouping, wherein the magnetic data storage device comprising the data track further comprises a second magnetic spacing measurement pattern grouping comprising a third magnetic spacing measurement pattern offset from the center of the data track by a third offset value and a fourth magnetic spacing measurement pattern offset from the center of the data track by a fourth, different offset value, wherein the first magnetic spacing measurement pattern grouping is located at a different circumferential position than the second magnetic spacing measurement pattern grouping, and wherein the method further comprises:

controlling, by the at least one processor, the read head to pass over the data track including the second magnetic spacing measurement pattern grouping;

receiving, by the at least one processor, a second signal indicative of magnetic transitions sensed by the read head during the pass over the second magnetic spacing measurement pattern grouping;

determining, by the at least one processor, for each of the third magnetic spacing measurement pattern and the fourth magnetic spacing measurement pattern, a respective first harmonic tone based on the second signal;

determining, by the at least one processor, for each of the third magnetic spacing measurement pattern and the fourth magnetic spacing measurement pattern, a respective second harmonic tone based on the second signal;

determining, by the at least one processor, for each of the third magnetic spacing measurement pattern and the fourth magnetic spacing measurement pattern, a ratio of the respective first harmonic tone and the respective second harmonic tone;

determining, by the at least one processor, a second maximum ratio; and utilizing, by the at least one processor, the second maximum ratio to determine a relative spacing between the read head and a surface of the magnetic data storage device.

16. The method of claim 11, wherein the magnetic data storage device comprises a magnetic data storage disk, wherein the offset comprises a radial offset, wherein the first offset value comprises a first radial offset value, and wherein the second, different offset value comprises a second, different radial offset value.

17. A system comprising:
  means for controlling a read head to pass over a data track including a magnetic spacing measurement pattern grouping comprising a first magnetic spacing measurement pattern and a second magnetic spacing measurement pattern, wherein the first magnetic spacing measurement pattern is offset from a center of the data track by a first offset value, wherein the second magnetic spacing measurement pattern is offset from the center of the data track by a second, different offset value, and wherein a magnetic data storage device comprises the data track;
  means for receiving a signal indicative of magnetic transitions sensed by the read head during the pass;
  means for determining, for each of the first magnetic spacing measurement pattern and the second magnetic spacing measurement pattern, a respective first harmonic tone based on the signal;
  means for determining, for each of the first magnetic spacing measurement pattern and the second magnetic spacing measurement pattern, a respective second harmonic tone based on the second signal;
  means for determining for each of the first magnetic spacing measurement pattern and the second magnetic spacing measurement pattern, a ratio of the respective first harmonic tone and the respective second harmonic tone;
  means for determining a maximum ratio; and
  means for utilizing the maximum ratio in determining a relative spacing between the read head and a surface of the magnetic data storage device.

18. The system of claim 17, wherein the maximum ratio comprises a first maximum ratio, wherein the signal comprises a first signal, wherein the magnetic spacing measurement pattern grouping comprises a first magnetic spacing measurement pattern grouping, wherein the magnetic data storage device comprising the data track further comprises a second magnetic spacing measurement pattern grouping comprising a third magnetic spacing measurement pattern offset from the center of the data track by a third offset value and a fourth magnetic spacing measurement pattern offset from the center of the data track by a fourth, different offset value, wherein the first magnetic spacing measurement pattern grouping is located at a different circumferential position than the second magnetic spacing measurement pattern grouping, and wherein the system further comprises:
  means for controlling the read head to pass over the second magnetic spacing measurement pattern grouping;
  means for receiving a second signal indicative of magnetic transitions sensed by the read head during the pass over the second magnetic spacing measurement pattern grouping;
  means for determining, for each of the third magnetic spacing measurement pattern and the fourth magnetic spacing measurement pattern, a respective first harmonic tone based on the second signal;
  means for determining, for each of the third magnetic spacing measurement pattern and the fourth magnetic spacing measurement pattern, a respective second harmonic tone based on the second signal;
  means for determining, for each of the third magnetic spacing measurement pattern and the fourth magnetic spacing measurement pattern, a ratio of the respective first harmonic tone and the respective second harmonic tone;
  means for determining a second maximum ratio; and
  means for utilizing the second maximum ratio to determine a relative spacing between the read head and a surface of the magnetic data storage device.

19. A computer-readable non-transitory storage medium comprising instructions that, when executed, cause one or more processors of a storage device to:
  control the read head to pass over the data track including a magnetic spacing measurement pattern grouping comprising a first magnetic spacing measurement pattern and a second magnetic spacing measurement pattern, wherein the first magnetic spacing measurement pattern is offset from a center of the data track by a first offset value, wherein the second magnetic spacing measurement pattern is offset from the center of the data track by a second, different offset value, and wherein a magnetic data storage device comprises the data track;
  receive a signal indicative of magnetic transitions sensed by the read head during the pass;
  determine, for each of the first magnetic spacing measurement pattern and the second magnetic spacing measurement pattern, a respective first harmonic tone based on the signal;
  determine, for each of the first magnetic spacing measurement pattern and the second magnetic spacing measurement pattern, a respective second harmonic tone based on the second signal;
  determine, for each of the first magnetic spacing measurement pattern and the second magnetic spacing measurement pattern, a ratio of the respective first harmonic tone and the respective second harmonic tone;
  determine a maximum ratio; and
  utilize the maximum ratio to determine a relative spacing between the read head and a surface of the magnetic data storage device.

20. The computer-readable storage medium of claim 19, wherein the maximum ratio comprises a first maximum ratio, wherein the signal comprises a first signal, wherein the magnetic spacing measurement pattern grouping comprises a first magnetic spacing measurement pattern grouping, wherein the magnetic data storage device comprising the data track further comprises a second magnetic spacing measurement pattern grouping comprising a third magnetic spacing measurement pattern offset from the center of the data track by a third offset value and a fourth magnetic spacing measurement pattern offset from the center of the data track by a fourth, different offset value, wherein the first magnetic spacing measurement pattern grouping is located at a different circumferential position than the second magnetic spacing measurement pattern grouping, and further comprising instructions that, when executed, cause the one or more processors of the storage device to:
  control the read head to pass over the second magnetic spacing measurement pattern grouping;
  receive a second signal indicative of magnetic transitions sensed by the read head during the pass over the second magnetic spacing measurement pattern grouping;

determine, for each of the third magnetic spacing measurement pattern and the fourth magnetic spacing measurement pattern, a respective first harmonic tone based on the second signal;

determine, for each of the third magnetic spacing measurement pattern and the fourth magnetic spacing measurement pattern, a respective second harmonic tone based on the second signal;

determine, for each of the third magnetic spacing measurement pattern and the fourth magnetic spacing measurement pattern, a ratio of the respective first harmonic tone and the respective second harmonic tone;

determine a second maximum ratio; and utilize the second maximum ratio to determine a relative spacing between the read head and a surface of the magnetic data storage device.

* * * * *